US012763592B2

(12) United States Patent
Feng et al.

(10) Patent No.: US 12,763,592 B2
(45) Date of Patent: Oct. 13, 2026

(54) CHARGING CIRCUIT, CHARGING CONTROL METHOD, AND ELECTRONIC DEVICE

(71) Applicant: Honor Device Co., Ltd., Shenzhen (CN)

(72) Inventors: Yingqun Feng, Shenzhen (CN); Fei Xu, Shenzhen (CN); Dawei Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 728 days.

(21) Appl. No.: 18/247,716

(22) PCT Filed: Jan. 3, 2023

(86) PCT No.: PCT/CN2023/070172
§ 371 (c)(1),
(2) Date: Apr. 3, 2023

(87) PCT Pub. No.: WO2023/197699
PCT Pub. Date: Oct. 19, 2023

(65) Prior Publication Data
US 2024/0372382 A1 Nov. 7, 2024

(30) Foreign Application Priority Data
Apr. 14, 2022 (CN) ......................... 202210386847.2

(51) Int. Cl.
*H02J 7/40* (2026.01)
*H02J 7/64* (2026.01)
*H02J 7/90* (2026.01)

(52) U.S. Cl.
CPC .................................... *H02J 7/64* (2026.01); *H02J 7/40* (2026.01); *H02J 7/933* (2026.01)

(58) Field of Classification Search
CPC .................................... H02J 7/65; H02J 7/933
See application file for complete search history.

(56) References Cited

U.S. PATENT DOCUMENTS 10,186,895 B2 1/2019 Zhang et al.
11,387,661 B2 7/2022 Fan
(Continued)

FOREIGN PATENT DOCUMENTS

CN 101567556 A 10/2009
CN 103779907 A 5/2014
(Continued)

OTHER PUBLICATIONS

Wei Yongxiang; "Design of Quick Charging Mobile Power Supply Based on USB_PD Protocol". University of South China; (May 20, 2020), Master Dissertation; Jan. 15, 2021; including English Abstract; 72 total pages.

*Primary Examiner* — Robert Grant
(74) *Attorney, Agent, or Firm* — WOMBLE BOND DICKINSON (US) LLP

(57) ABSTRACT

A charging control method, and an electronic device are provided. The charging circuit includes a first power supply terminal, a second power supply terminal, a controller, a first switch, a second switch, a first charging chip, and a second charging chip. The second charging chip supports a fast charging protocol. The first power supply terminal is coupled to the first charging chip through the first switch and coupled to the second charging chip through the second switch, and the first power supply terminal is configured to be coupled to a charger. The first charging chip and the second charging chip are further coupled to the second power supply terminal, to be coupled to a battery. The first charging chip is coupled to a communication terminal of the charger. The first charging chip communicates with the
(Continued)

charger to determine that the charger supports the fast charging protocol.

20 Claims, 14 Drawing Sheets

(56) References Cited

U.S. PATENT DOCUMENTS

| | | | | |
|---|---|---|---|---|
| 11,451,077 | B2 | 9/2022 | Sun et al. | |
| 2017/0054328 | A1* | 2/2017 | Jung ..................... | H02J 7/0063 |
| 2018/0048170 | A1 | 2/2018 | Sun et al. | |
| 2018/0166889 | A1 | 6/2018 | Xu | |
| 2021/0075244 | A1 | 3/2021 | Cho et al. | |
| 2021/0313812 | A1 | 10/2021 | Chen et al. | |

FOREIGN PATENT DOCUMENTS

| | | | |
|---|---|---|---|
| CN | 106537719 | A | 3/2017 |
| CN | 106654742 | A | 5/2017 |
| CN | 111200274 | A | 5/2020 |
| CN | 111601422 | A | 8/2020 |
| CN | 112803558 | A | 5/2021 |
| CN | 113078696 | A | 7/2021 |
| CN | 113178927 | A | 7/2021 |
| CN | 113508509 | A | 10/2021 |
| CN | 114498865 | A | 5/2022 |

* cited by examiner

CHARGING CIRCUIT, CHARGING CONTROL METHOD, AND ELECTRONIC DEVICE

CROSS-REFERENCE TO RELATED APPLICATIONS

This application is a national stage of International Application No. PCT/CN2023/070172, filed on Jan. 3, 2023, which claims priority to Chinese Patent Application No. 202210386847.2, filed on Apr. 14, 2022. The disclosures of both of the aforementioned applications are hereby incorporated by reference in their entireties.

TECHNICAL FIELD

This application relates to the field of charging technologies, and in particular, to a charging circuit, a charging control method, and an electronic device.

BACKGROUND

An increasing quantity of electronic devices support fast charging, and one way of fast charging is to increase a charging voltage. However, a low withstand voltage is designed for some charging circuits (or charging chips), and consequently the charging circuits (or charging chips) are extremely vulnerable to damage during high-voltage charging.

SUMMARY

In view of this, this application provides a charging circuit, a charging control method, and an electronic device, to perform overvoltage protection on a charging circuit in an electronic device.

According to a first aspect, this application provides a charging circuit, including a first power supply terminal, a second power supply terminal, a controller, a first switch, a second switch, a first charging chip, and a second charging chip. The second charging chip supports a fast charging protocol. The first power supply terminal is coupled to the first charging chip through the first switch and coupled to the second charging chip through the second switch, and the first power supply terminal is configured to be coupled to a power supply terminal of a charger. The first charging chip and the second charging chip are further coupled to the second power supply terminal, and the second power supply terminal is configured to be coupled to a battery. The first charging chip is further configured to be coupled to a communication terminal of the charger. The first charging chip is configured to communicate with the charger to determine that the charger supports the fast charging protocol. The controller is configured to control the first switch to open, control the second switch to close, and control the first charging chip to obtain power from the battery. The first charging chip is further configured to control, based on the fast charging protocol, the charger to increase a charging voltage, to fast charge the battery by using the second charging chip.

According to the charging circuit provided in this embodiment of this application, when an electronic device is coupled to the charger to charge the battery in the electronic device, the charging circuit in the electronic device negotiates with the charger to determine that the charger supports the fast charging protocol, coupling between the power supply terminal of the charger and a first charging sub-circuit that is in the charging circuit and that supports a slow charging protocol is disconnected, the power supply terminal of the charger is coupled to the second charging chip that supports the fast charging protocol, and the charger is controlled to increase the charging voltage, so that the charger fast charges the battery by using a second charging sub-circuit, and the first charging chip that is non-resistant to a high voltage is prevented from bearing a high charging voltage, thereby implementing overvoltage protection on the charging circuit in the electronic device.

In a possible implementation, the first charging chip includes a charging protocol negotiation circuit and a first charging sub-circuit, the charging protocol negotiation circuit is configured to communicate with the charger, and the controller is further configured to: during opening of the first switch, control the first charging sub-circuit to supply power from the battery to the charging protocol negotiation circuit. In this way, the charging protocol negotiation circuit can continue to operate, to negotiate with the charger on increasing or decreasing a charging voltage.

In a possible implementation, the first charging sub-circuit includes a voltage conversion circuit and a selection switch, and the controller is specifically configured to: during opening of the first switch, control the selection switch to couple the charging protocol negotiation circuit to the battery through the voltage conversion circuit. This implementation provides a manner in which the controller controls (the charging protocol negotiation circuit in) the first charging chip to obtain power from the battery.

In a possible implementation, the voltage conversion circuit is an on-the-go (On-The-Go, OTG) circuit. An existing OTG circuit is used to reversely increase a voltage of the battery, thereby supplying power to the charging protocol negotiation circuit.

In a possible implementation, after fast charging ends, the first charging chip is further configured to control the charger to decrease a charging voltage; and the controller is further configured to control the first switch to close, control the second switch to open, and control the first charging chip to obtain power from the charger and charge the battery. After a fast charging phase ends, a slow charging phase is entered, until the battery is fully charged.

In a possible implementation, the charging circuit further includes a voltage divider circuit, and the first switch includes a control terminal, a first controlled terminal, and a second controlled terminal; and the first controlled terminal is coupled to the first power supply terminal, the second controlled terminal is coupled to the first charging chip, the voltage divider circuit is configured to divide a voltage of the first power supply terminal for output to the control terminal, and when a voltage of the control terminal is higher than a threshold, the first controlled terminal is disconnected from the second controlled terminal. The voltage divider circuit can automatically break a connection between the charger and the first charging chip when an output voltage of the charger is excessively high, thereby performing overvoltage protection on the first charging chip.

In a possible implementation, the voltage divider circuit includes a first resistor and a second resistor that are connected in series, the first power supply terminal is grounded through the first resistor and the second resistor that are connected in series, and coupling terminals of the first resistor and the second resistor are coupled to the control terminal of the first switch. This implementation provides a possible structure of the voltage divider circuit.

In a possible implementation, the charging circuit further includes a diode, the controller is coupled to an anode of the diode, a cathode of the diode is coupled to the control terminal of the first switch, and the controller controls disconnection or connection between the first controlled terminal and the second controlled terminal by controlling the voltage of the control terminal of the first switch. A function of the diode is to prevent the voltage of the first power supply terminal from increasing and being reversely applied to a pin of the controller, thereby performing overvoltage protection on the controller.

According to a second aspect, a charging control method is provided and applied to a charging circuit. The charging circuit includes a controller, a first switch, a second switch, a first charging chip, and a second charging chip. The second charging chip supports a fast charging protocol. The method includes: the first charging chip communicates with a charger to determine that the charger supports the fast charging protocol. The controller controls the first switch to disconnect the first charging chip from the charger, controls the second switch to connect the second charging chip to the charger, and controls the first charging chip to obtain power from a battery. The first charging chip controls, based on the fast charging protocol, the charger to increase a charging voltage, to fast charge the battery by using the second charging chip.

In a possible implementation, the first charging chip includes a charging protocol negotiation circuit and a first charging sub-circuit, the charging protocol negotiation circuit is configured to communicate with the charger, and the method further includes: during opening of the first switch, the controller controls the first charging sub-circuit to supply power from the battery to the charging protocol negotiation circuit.

In a possible implementation, the first charging sub-circuit includes a voltage conversion circuit and a selection switch, and the method further includes: during opening of the first switch, the controller controls the selection switch to couple the charging protocol negotiation circuit to the battery through the voltage conversion circuit.

In a possible implementation, the method further includes: after fast charging ends, the first charging chip controls the charger to decrease a charging voltage; and the controller controls the first switch to connect the first charging chip to the charger, controls the second switch to disconnect the second charging chip from the charger, and controls the first charging chip to obtain power from the charger and charge the battery.

According to a third aspect, an electronic device is provided and includes the charging circuit according to any one of the first aspect and the implementations of the first aspect and a battery, and the charging circuit is configured to charge the battery.

According to a fourth aspect, a computer-readable storage medium is provided. The computer-readable storage medium includes instructions. When the instructions are run on an electronic device, the electronic device is enabled to perform the method according to any one of the second aspect and the implementations of the second aspect.

According to a fifth aspect, a computer program product including instructions is provided. When the instructions are run on an electronic device, the electronic device is enabled to perform the method according to any one of the second aspect and the implementations of the second aspect.

According to a sixth aspect, a chip system is provided. The chip system includes a processor, configured to support an electronic device in implementing functions in the second aspect. In a possible design, the chip system further includes an interface circuit. The interface circuit may be configured to receive a signal from another apparatus (for example, a memory), or send a signal to another apparatus (for example, a communication interface). The chip system may include a chip, and may further include another discrete device.

For technical effects of the second aspect to the sixth aspect, refer to the technical effects according to any one of the first aspect and the implementations of the first aspect. Details are not repeated herein.

DESCRIPTION OF EMBODIMENTS

It should be noted that, in embodiments of this application, terms such as "first" and "second" are merely used for distinguishing between features of a same type, and cannot be understood as an indication of relative importance, a quantity, a sequence, or the like.

In the embodiments of this application, the term "in an example" or "for example" is used to represent giving an example, an illustration, or a description. Any embodiment or design solution described as "in an example" or "for example" in this application should not be explained as being more preferred or advantageous than another embodiment or design solution. To be precise, the use of the term such as "in an example" or "for example" is intended to present a related concept in a specific manner.

In the embodiments of this application, the term "couple" or "connection" should be understood in a broad sense. For example, the connection may be a physically direct connection, or an indirect connection realized through an electronic device, such as a connection realized through a resistor, an inductor, a capacitor, or other electronic devices.

Figure 1:
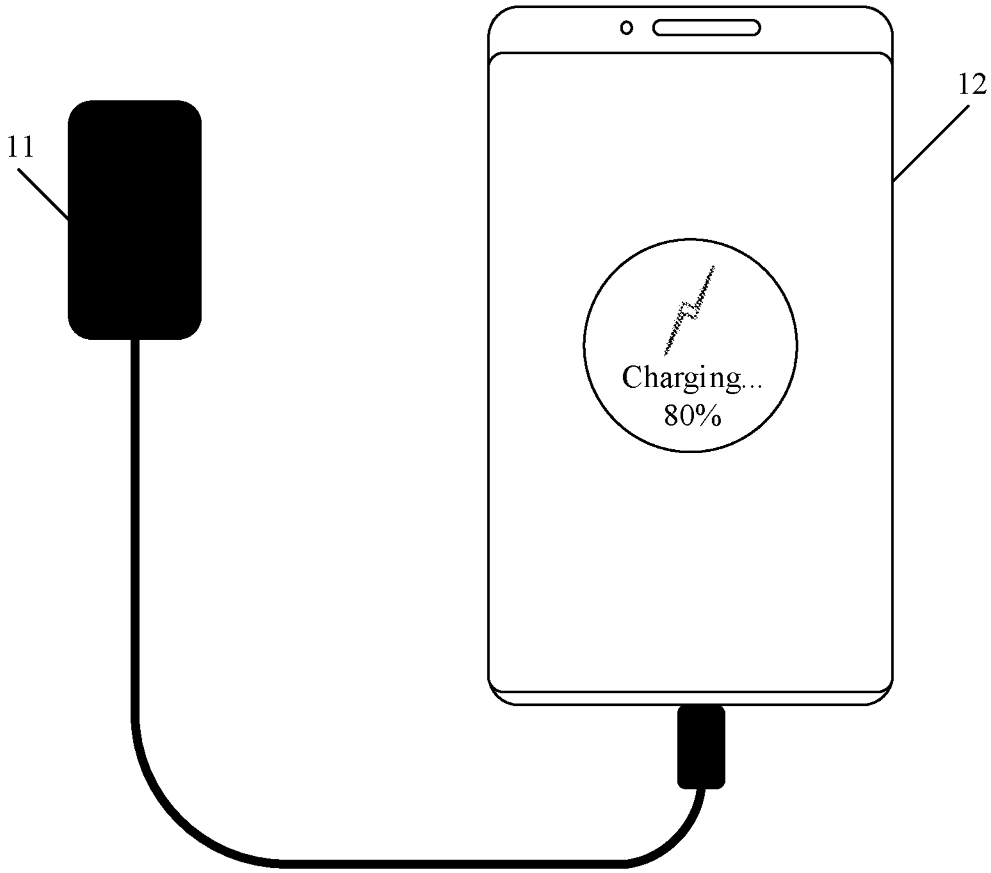
FIG. 1 is a schematic diagram of an architecture of a charging system according to an embodiment of this application.
Figure 2:
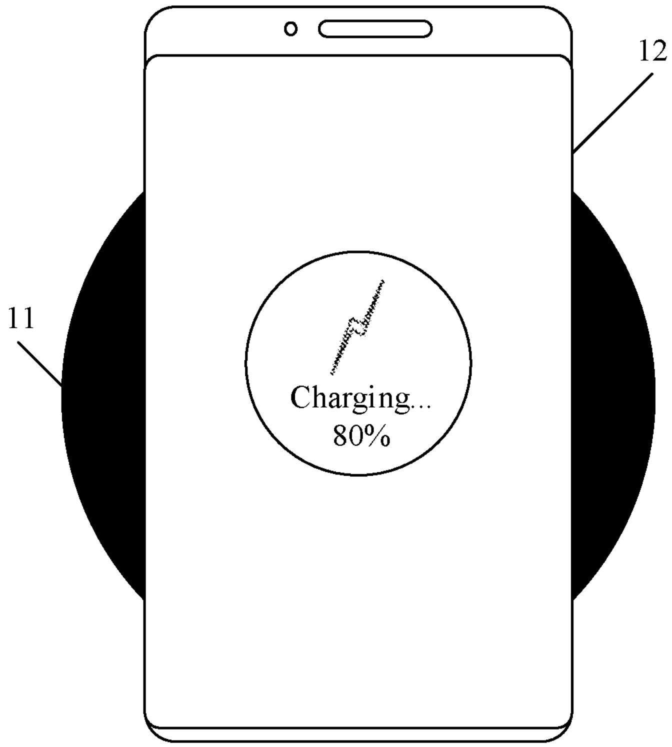
FIG. 2 is a schematic diagram of an architecture of another charging system according to an embodiment of this application.

As shown in FIG. 1 and FIG. 2, an embodiment of this application provides a charging system, including a charger

11 and an electronic device 12. The charger 11 is configured to charge the electronic device 12. The charger 11 may be a wired charger shown in FIG. 1 or a wireless charger shown in FIG. 2. During charging, the charger 11 shown in FIG. 1 is connected to the electronic device 12 in a wired manner, and the charger 11 shown in FIG. 2 is coupled to a wireless charging coil (see a wireless charging coil 242 in FIG. 3) in the electronic device 12 in a wireless manner (for example, electromagnetic induction).

The charger 11 can support slow charging (which may also be referred to as low-power charging or common charging) and fast charging (which may also be referred to as high-power charging or super fast charging). Fast charging has a higher charging power (a larger charging current or a higher charging voltage) than slow charging, and therefore the electronic device can be fully charged in a shorter time.

The electronic device in this embodiment of this application may be a device having a wireless transceiver function, and the electronic device may be mobile or fixed. The electronic device may be deployed on land (for example, indoor or outdoor, or handheld or vehicle-mounted); or may be deployed on a water surface (for example, a ship); or may alternatively be deployed in the air (for example, an airplane, a balloon, or a satellite). The electronic device may be user equipment (user equipment, UE), an access terminal, a terminal unit, a subscriber unit (subscriber unit), a terminal station, a mobile station (mobile station, MS), a mobile console, a remote station, a remote terminal, a mobile device, a wireless communication device, a terminal agent, a terminal apparatus, or the like in a 4th generation (4th generation, 4G) network, a 5th generation (5th generation, 5G) network, or a future evolved public land mobile network (public land mobile network, PLMN). For example, the electronic device may be a mobile phone, a tablet computer, a notebook computer, a smart band, a smartwatch, a headset, a smart speaker, a virtual reality (virtual reality, VR) device, an augmented reality (augmented reality, AR) device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. A specific type and structure and the like of the electronic device are not limited in this embodiment of this application.

Figure 3:
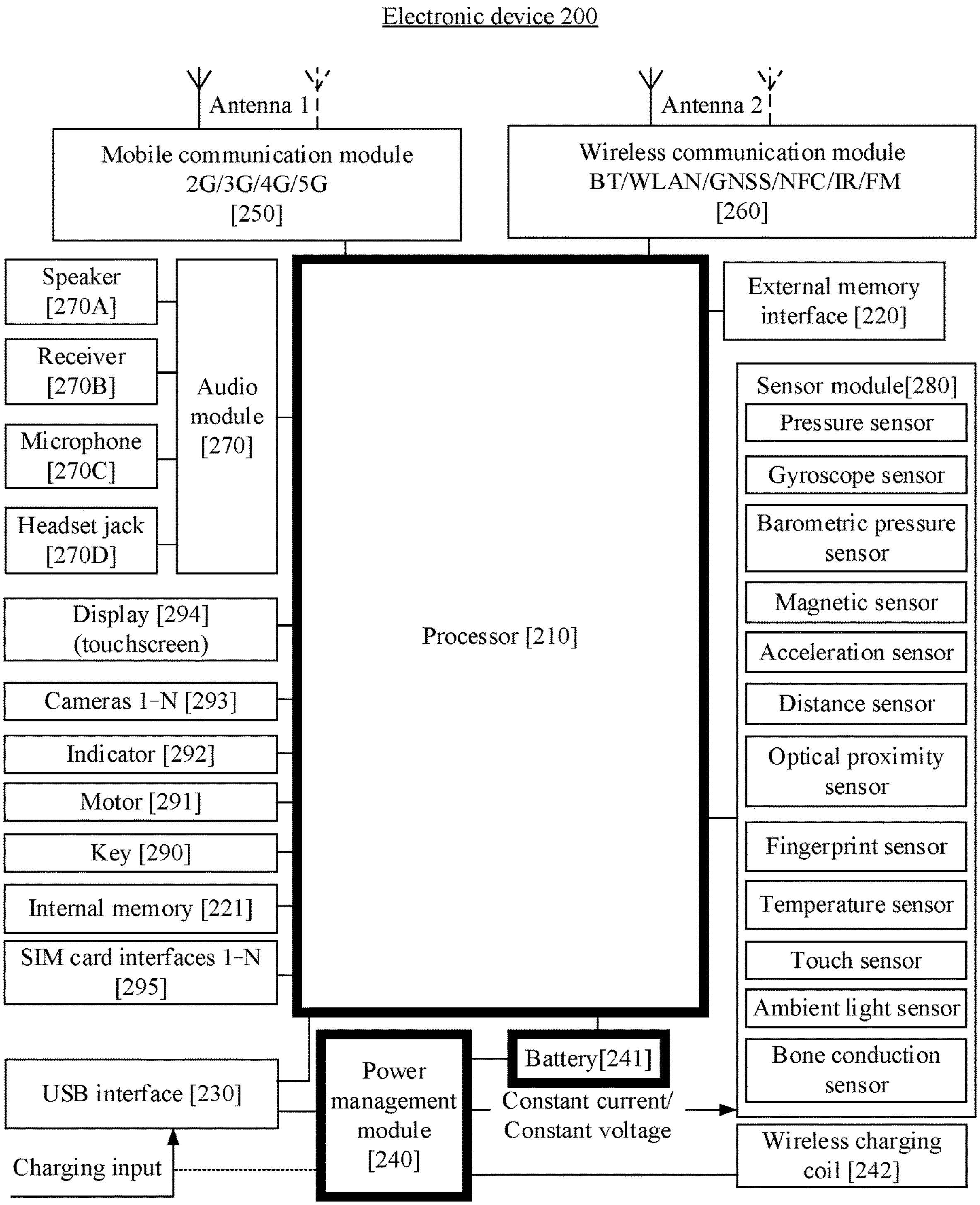
FIG. 3 is a schematic diagram of a structure of an electronic device according to an embodiment of this application.

For example, the electronic device is a mobile phone. FIG. 3 shows a possible structure of the electronic device. The electronic device 200 may include a processor 210, an external memory interface 220, an internal memory 221, a universal serial bus (universal serial bus, USB) interface 230, a power management module 240, a battery 241, a wireless charging coil 242, an antenna 1, an antenna 2, a mobile communication module 250, a wireless communication module 260, an audio module 270, a speaker 270A, a receiver 270B, a microphone 270C, a headset jack 270D, a sensor module 280, a key 290, a motor 291, an indicator 292, a camera 293, a display 294, a subscriber identification module (subscriber identification module, SIM) card interface 295, and the like.

The sensor module 280 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It can be understood that an example structure in this embodiment of this application does not constitute a specific limitation on the electronic device 200. In some other implementations of this application, the electronic device 200 may include more or fewer components than those shown in the figure, or may combine some components, or may split some components, or may have different component arrangements. The illustrated components may be implemented by hardware, software, or a combination of software and hardware.

The processor 210 may include one or more processing units. For example, the processor 210 may include a central processing unit (central processing unit, CPU), an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and the like. The different processing units may be independent devices, or may be integrated into one or more processors. For example, the processor 210 may be an application processor AP. Alternatively, the processor 210 may be integrated in a system on chip (system on chip, SoC). Alternatively, the processor 210 may be integrated in an integrated circuit (integrated circuit, IC) chip. The processor 210 may include an analog front end (analog front end, AFE) and a micro control unit (micro-controller unit, MCU) in the IC chip.

The controller may be a nerve center and a command center of the electronic device 200. The controller may generate an operation control signal based on an instruction operation code and a timing signal, and complete control on instruction fetching and instruction execution.

A memory may be further disposed in the processor 210 to store instructions and data. In some implementations, the memory in the processor 210 is a cache memory. The memory may store an instruction or data that has just been used or has been cyclically used by the processor 210. If the processor 210 needs to use the instruction or the data again, the processor 210 may directly invoke the instruction or the data from the memory. This avoids repeated access, reduces a waiting time of the processor 210, and therefore improves system efficiency.

In some implementations, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a USB interface, and/or the like.

It can be understood that an interface connection relationship between the modules shown in this embodiment of this application is merely an example for description, and does not constitute a limitation on a structure of the electronic device 200. In some other implementations of this application, the electronic device 200 may use an interface connection manner different from that in the foregoing implementations or a combination of a plurality of interface connection manners.

A wireless communication function of the electronic device 200 may be implemented by using the antenna 1, the antenna 2, the mobile communication module 250, the wireless communication module 260, the modem processor, the baseband processor, and the like.

The antenna 1 and the antenna 2 are configured to transmit and receive electromagnetic wave signals. Each antenna in the electronic device 200 may be configured to cover one or more communication bands. Different antennas may be further multiplexed to improve antenna utilization. For example, the antenna 1 may be multiplexed as a diversity antenna of a wireless local area network. In some other implementations, the antenna may be used together with a tuning switch.

The mobile communication module 250 may provide a wireless communication solution including 2G/3G/4G/5G and the like applicable to the electronic device 200. The wireless communication module 260 may provide a wireless communication solution applicable to the electronic device 200, including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), or an infrared (infrared, IR) technology. In some implementations, in the electronic device 200, the antenna 1 is coupled to the mobile communication module 250, and the antenna 2 is coupled to the wireless communication module 260, so that the electronic device 200 can communicate with a network and other devices by using a wireless communication technology.

The electronic device 200 implements a display function by using the GPU, the display 294, the application processor, and the like. The GPU is a microprocessor for image processing, and connects the display 294 and the application processor. The GPU is configured to perform mathematical and geometric calculation for graphics rendering. The processor 210 may include one or more GPUs that execute program instructions to generate or change display information.

The display 294 is configured to display an image, a video, and the like. The display 294 includes a display panel. In some implementations, the electronic device 200 may include one or N displays 294, where N is a positive integer greater than 1.

The electronic device 200 can implement a photographing function by using the ISP, the camera 293, the video codec, the GPU, the display 294, the application processor, and the like. The ISP is configured to process data fed back by the camera 293. In some implementations, the ISP may be disposed in the camera 293. The camera 293 is configured to capture a still image or a video. In some implementations, the electronic device 200 may include one or N cameras 293, where N is a positive integer greater than 1.

The external memory interface 220 may be configured to connect to an external storage card such as a micro SanDisk (micro SanDisk, Micro SD) card, to expand a storage capability of the electronic device 200. The external storage card communicates with the processor 210 by using the external memory interface 220, to implement a data storage function, for example, to store music, videos, and other files in the external storage card.

The internal memory 221 may be configured to store computer executable program code, and the executable program code includes instructions. The processor 210 executes various functional applications and data processing of the electronic device 200 by running the instructions stored in the internal memory 221. In addition, the internal memory 221 may include a high-speed random access memory, and may further include a non-volatile memory such as at least one magnetic disk storage device, a flash memory device, or a universal flash storage (universal flash storage, UFS).

The electronic device 200 can implement an audio function by using the audio module 270, the speaker 270A, the receiver 270B, the microphone 270C, the headset jack 270D, the application processor, and the like, for example, music playing or sound recording.

The audio module 270 is configured to convert digital audio information into an analog audio signal for output, and may also be configured to convert an analog audio input into a digital audio signal. In some implementations, the audio module 270 may be disposed in the processor 210, or some functional modules of the audio module 270 may be disposed in the processor 210. The speaker 270A, also referred to as a "horn", is configured to convert an audio electrical signal into a sound signal. The receiver 270B, also referred to as an "earpiece", is configured to convert an audio electrical signal into a sound signal. The microphone 270C, also referred to as a "mic" or a "mike", is configured to convert a sound signal into an electrical signal. At least one microphone 270C may be disposed in the electronic device 200. The headset jack 270D is configured to connect to a wired headset. The headset jack 270D may be the USB interface 230, or may be a 3.5 mm open mobile terminal platform (open mobile terminal platform, OMTP) standard interface or a cellular telecommunications industry association of the USA (cellular telecommunications industry association of the USA, CTIA) standard interface.

The key 290 includes a power-on key, a volume key, and the like. The key 290 may be a mechanical key, or may be a touch key. The electronic device 200 may receive a key input to generate a key signal input related to user settings and function control of the electronic device 200. The motor 291 can generate a vibration prompt. The motor 291 may be configured to provide an incoming call vibration prompt, or may be configured to provide touch vibration feedback. The indicator 292 may be an indicator light, which may be configured to indicate a charging state and a power change, or to indicate a message, a missed call, a notification, or the like. The SIM card interface 295 is configured to connect to a SIM card. The SIM card may be inserted into the SIM card interface 295 or removed from the SIM card interface 295 to implement contact with or separation from the electronic device 200. The electronic device 200 can support 1 or N SIM card interfaces, where N is a positive integer greater than 1. The SIM card interface 195 can support a nano SIN (Nano SIM) card, a micro SIM (Micro SIM) card, a SIM card, and the like. In some implementations, the electronic device 200 uses an embedded SIM (embedded SIM, eSIM) card. The eSIM card may be embedded in the electronic device 200, and cannot be separated from the electronic device 200.

The power management module 240 is configured to receive a charging input from a charger. The charger may be a wireless charger (such as a wireless charging base of the electronic device 200 or another device that can wirelessly charge the electronic device 200), or may be a wired charger. For example, the power management module 240 may receive a charging input from the wired charger by using the USB interface 230. The power management module 240 may receive a wireless charging input by using the wireless charging coil 242 of the electronic device 200.

The power management module 240 may supply power to the electronic device 200 while charging the battery 241.

The power management module 240 receives an input of the battery 241, and supplies power to the processor 210, the internal memory 221, the external memory interface 220, the display 294, the camera 293, the wireless communication module 260, and the like. The power management module 240 may be further configured to monitor parameters such as a battery capacity, a battery cycle count, and a battery health status (leakage and impedance) of the battery 241. In some other implementations, the power management module 240 may alternatively be disposed in the processor 210.

The power management module 240 may use separate charging circuits to respectively support slow charging (which may also be referred to as low-power charging or common charging) and fast charging (which may also be referred to as high-power charging or super fast charging). Fast charging has a higher charging power (a larger charging current or a higher charging voltage) than slow charging, and therefore the electronic device 200 can be fully charged in a shorter time. The power management module 240 communicates with the charger to determine whether the charger supports a same fast charging protocol. If the charger supports the same fast charging protocol, the power management module 240 may control the charger to perform fast charging by increasing a charging current or a charging voltage; or otherwise, control the charger to perform slow charging (for example, provide a charging voltage of 5 V).

One way of fast charging is to increase a charging voltage, and one is to increase a charging current. For increasing a charging voltage, a low withstand voltage is designed for a charging circuit (or a charging chip) supporting slow charging in the power management module 240, and consequently the charging circuit (or charging chip) is extremely vulnerable to damage during high-voltage charging.

For this, an embodiment of this application provides a charging circuit. The charging circuit may be applied to the power management module 240 of the electronic device 200. When an electronic device is coupled to a charger to charge a battery in the electronic device, the charging circuit negotiates with the charger to determine that the charger supports a fast charging protocol, coupling between a power supply terminal of the charger and a first charging chip that supports a slow charging protocol is disconnected, the power supply terminal of the charger is coupled to a second charging chip that supports the fast charging protocol, and the charger is controlled to increase a charging voltage, so that the charger fast charges the battery by using the second charging chip. After fast charging ends, the charging circuit controls the charger to decrease a charging voltage, to disconnect coupling between the power supply terminal of the charger and the second charging chip that supports the fast charging protocol, and couples the power supply terminal of the charger to the first charging chip that supports the slow charging protocol, so that the charger slowly charges the battery by using the first charging chip, until an entire charging process ends.

Figure 4:
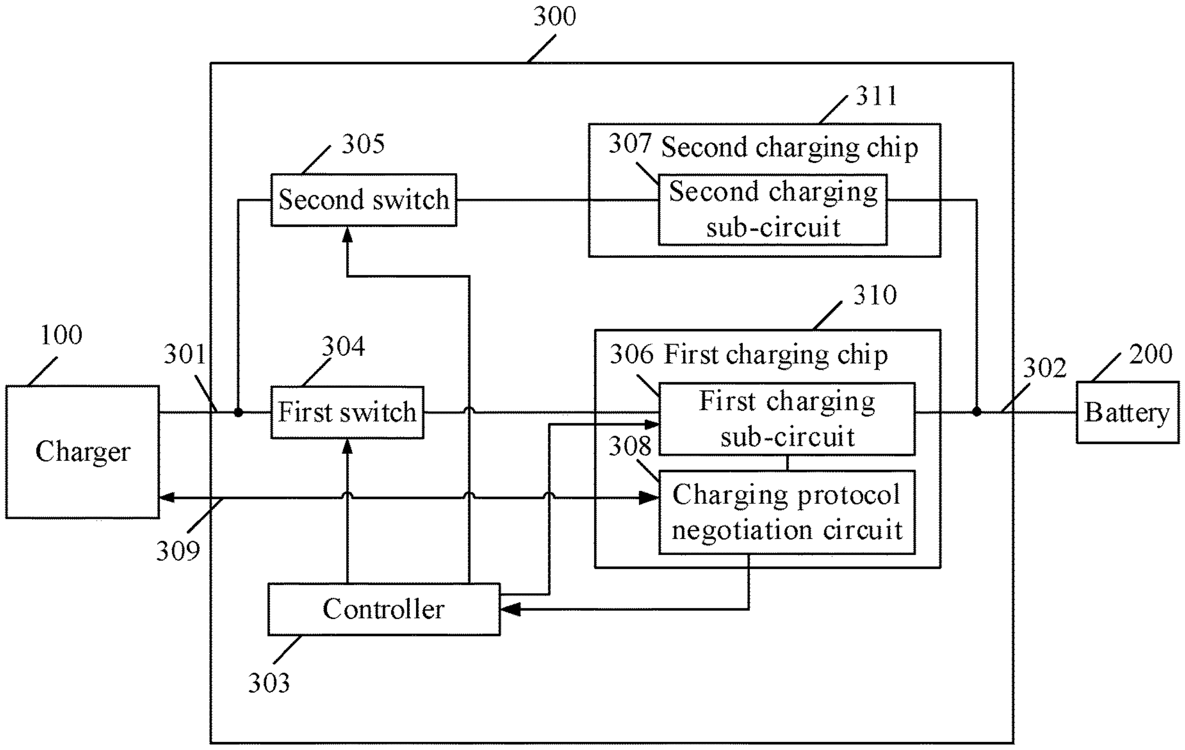
FIG. 4 is a schematic diagram of a structure of a charging circuit according to an embodiment of this application.

Specifically, as shown in FIG. 4, a charging circuit 300 includes a first power supply terminal 301, a second power supply terminal 302, a controller 303, a first switch 304, a second switch 305, a first charging sub-circuit 306, a second charging sub-circuit 307, a charging protocol negotiation circuit 308, and a communication terminal 309.

The first charging sub-circuit 306 and the charging protocol negotiation circuit 308 may be integrated in a first charging chip 310, and the second charging sub-circuit 307 may be integrated in a second charging chip 311. This is used as an example in this application, but this application is not limited thereto. The first charging sub-circuit 306 (or referred to as the first charging chip 310) does not support the fast charging protocol, and the second charging sub-circuit 307 (or referred to as the second charging chip 311) supports the fast charging protocol. In other words, a low withstand voltage may be designed for the first charging sub-circuit 306 (or referred to as the first charging chip 310), and a high withstand voltage may be designed for the second charging sub-circuit 307 (or referred to as the second charging chip 311).

The first power supply terminal 301 is configured to be coupled (in a wired or wireless manner) to a power supply terminal of a charger 100. The first power supply terminal 301 is coupled to the first charging sub-circuit 306 through the first switch 304, and the first power supply terminal 301 is further coupled to the second charging sub-circuit 307 through the second switch 305. The first charging sub-circuit 306 and the second charging sub-circuit 307 are further coupled to the second power supply terminal 302, and the second power supply terminal 302 is configured to be coupled to a battery 200. The charging protocol negotiation circuit 308 is coupled (in a wired or wireless manner) to a communication terminal of the charger 100 through the communication terminal 309. The controller 303 is coupled to the charging protocol negotiation circuit 308, the first charging sub-circuit 306, the first switch 304, and the second switch 305.

The charger 100 may provide a charging voltage for the charging circuit 300 by using the first power supply terminal 301. The charging circuit 300 may provide a charging voltage for the battery 200 by using the second power supply terminal 302 after performing voltage conversion. The charging protocol negotiation circuit 308 may communicate with the charger 100 through the communication terminal 309 to determine whether the charger 100 supports the fast charging protocol, and control the charging voltage output by the charger 100, so as to determine a charging status (for example, fast charging or slow charging). The charging protocol negotiation circuit 308 sends, to the controller 303, information about whether the charger 100 supports the fast charging protocol and a current charging state. The controller 303 is configured to control opening and closing of the first switch 304 and the second switch 305, and is further configured to control the first charging sub-circuit 306 to supply power from the charger 100 to the charging protocol negotiation circuit 308 or to supply power from the battery 200 to the charging protocol negotiation circuit 308.

Figure 5:
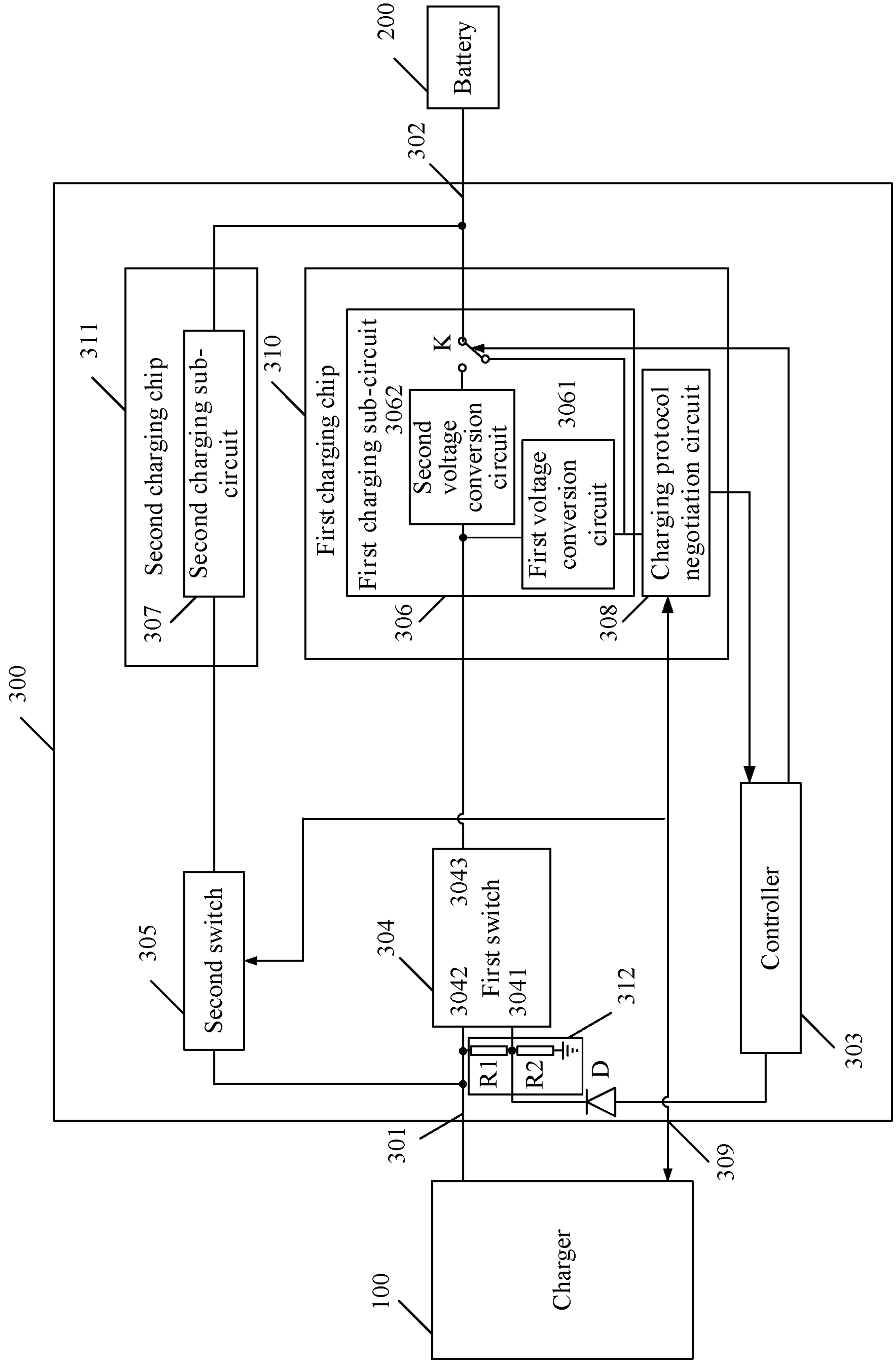
FIG. 5 is a schematic diagram of a structure of another charging circuit according to an embodiment of this application.
Figure 6:
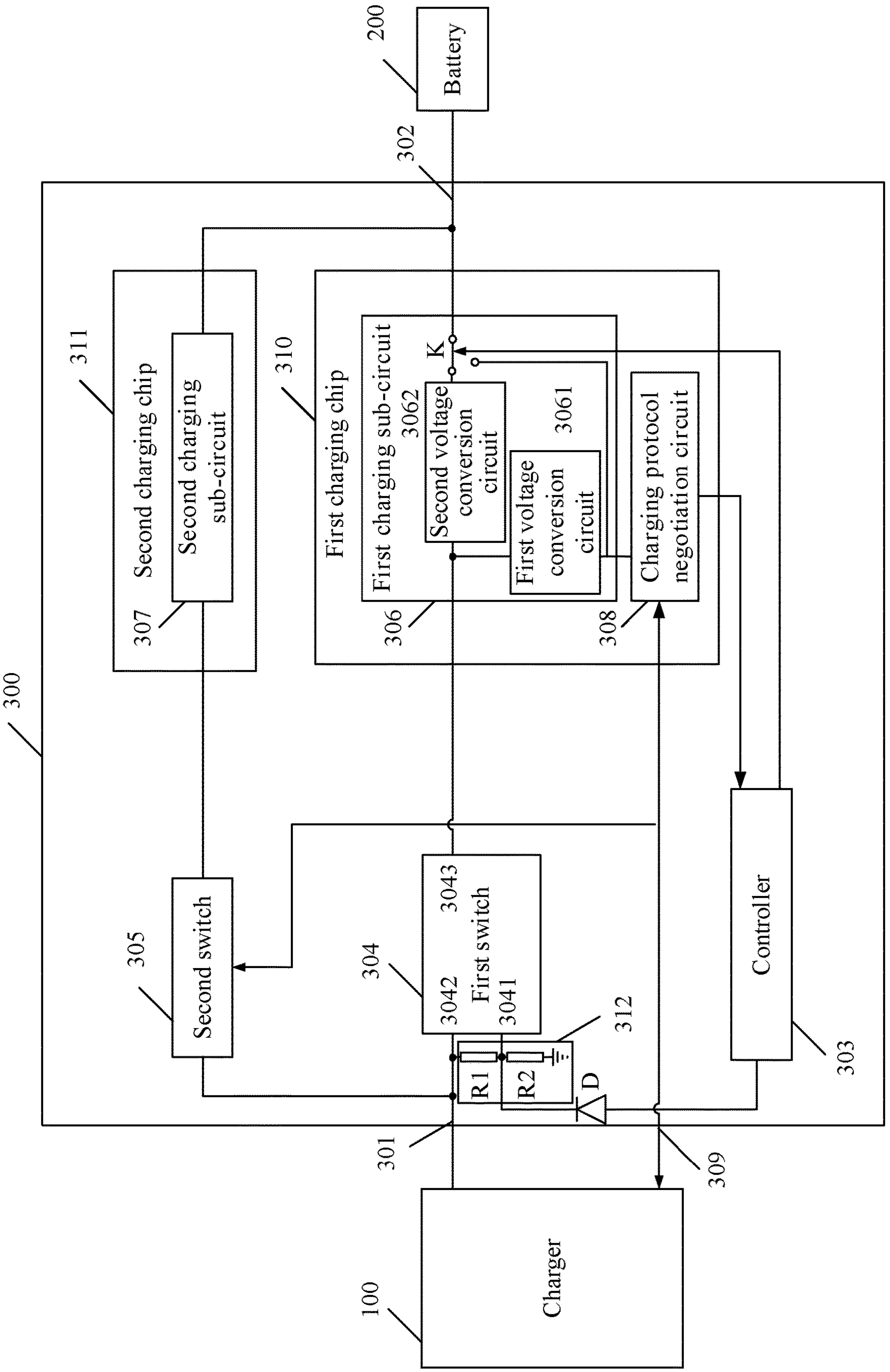
FIG. 6 is a schematic diagram of a structure of still another charging circuit according to an embodiment of this application.

As shown in FIG. 5 and FIG. 6, the first switch 304 may be an over voltage protection (over voltage protection, OVP) switch; the first switch 304 includes a control terminal 3041, a first controlled terminal 3042, and a second controlled terminal 3043; the first controlled terminal 3042 of the first switch 304 is coupled to the first power supply terminal 301; and the second controlled terminal 3043 of the first switch 304 is coupled to the first charging sub-circuit 306 of the first charging chip 310. The charging circuit 300 further includes a voltage divider circuit 312. The voltage divider circuit 312 is configured to divide a voltage at the first power supply terminal 301 for output to the control terminal 3041 of the first switch 304. The voltage divider circuit 312 may include a first resistor R1 and a second resistor R2 that are connected in series, the first power supply terminal 301 is grounded through the first resistor R1 and the second resistor R2 that are connected in series, and coupling terminals of the first resistor R1 and the second resistor R2 are coupled to the control terminal 3041 of the first switch 304. The charging circuit 300 further includes a diode D, the controller 303 is coupled to an anode of the diode D, and a cathode of the diode D is coupled to the control terminal 3041 of the first switch 304.

When the voltage of the first power supply terminal 301 increases and makes a voltage of the control terminal 3041 of the first switch 304 higher than a threshold, or when a voltage output by the controller 303 to the control terminal 3041 of the first switch 304 is higher than a threshold, the first controlled terminal 3042 and the second controlled terminal 3043 of the first switch 304 are disconnected. This prevents the voltage of the first power supply terminal 301 from being applied to the first charging chip 310 (or the first charging sub-circuit 306), thereby performing overvoltage protection on the first charging chip 310 (or the first charging sub-circuit 306). A function of the diode D is to prevent the voltage of the first power supply terminal 301 from increasing and being reversely applied to a pin of the controller 303, thereby performing overvoltage protection on the controller 303.

As shown in FIG. 5, the first charging sub-circuit 306 includes a first voltage conversion circuit 3061, a second voltage conversion circuit 3062, and a selection switch K. The first voltage conversion circuit 3061 may be a low dropout regulator (low dropout regulator, LDO). The second voltage conversion circuit 3062 may be an on-the-go (On-The-Go, OTG) circuit. The OTG circuit supports the electronic device in serving as a host to access another USB peripheral. The first voltage conversion circuit 3061 and the second voltage conversion circuit 3062 are both coupled to the second controlled terminal 3043 of the first switch 304. The first voltage conversion circuit 3061 is further coupled to the charging protocol negotiation circuit 308. The selection switch K is configured to select the first voltage conversion circuit 3061 or the second voltage conversion circuit 3062 to be coupled to the battery 200. The first voltage conversion circuit 3061 is configured to provide an operating voltage for the charging protocol negotiation circuit 308, and is further configured to provide a charging voltage for the battery 200. The battery 200 may further provide an operating voltage for the charging protocol negotiation circuit 308 through the second voltage conversion circuit 3062 and the first voltage conversion circuit 3061, that is, the battery 200 reversely supplies power to the charging protocol negotiation circuit 308.

Figure 7:
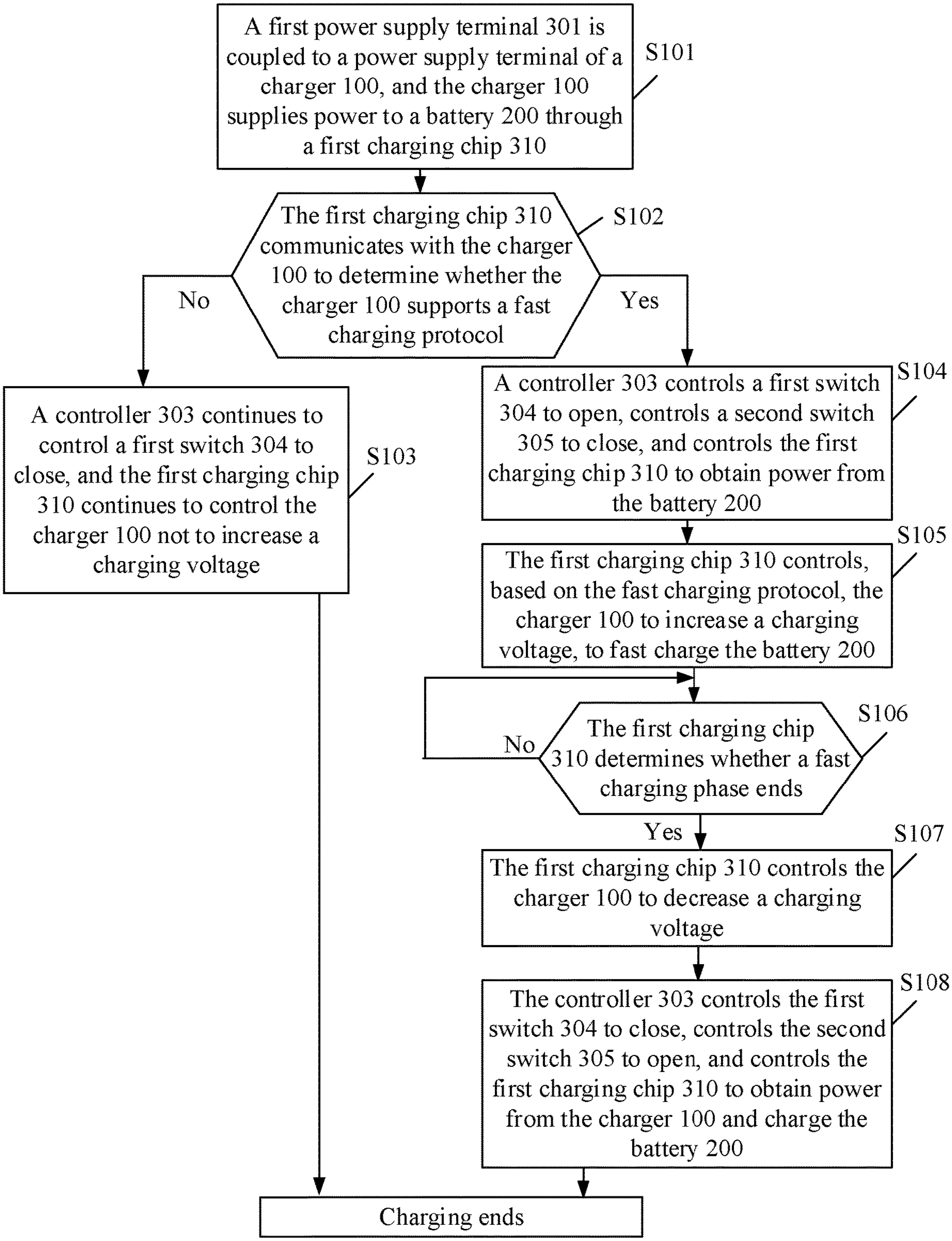
FIG. 7 is a schematic flowchart of a charging control method according to an embodiment of this application.

The charging circuit 200 performs a charging control method shown in FIG. 7, including the following steps.

S101: The first power supply terminal 301 is coupled to the power supply terminal of the charger 100, and the charger 100 supplies power to the battery 200 through the first charging chip 310.

The first switch 304 is closed by default. When the first power supply terminal 301 is coupled to the power supply terminal of the charger 100 (that is, when charging starts), the charger 100 outputs a charging voltage to the first power supply terminal 301, and the first charging sub-circuit 306 performs voltage conversion on the charging voltage at the first power supply terminal 301. A voltage obtained after conversion is used to charge the battery 200 and in addition supply power to the charging protocol negotiation circuit 308. At this time, the charging voltage at the first power supply terminal 301 is a default charging voltage (for example, 5 V), and the first charging sub-circuit 306 slowly charges the battery 200.

S102: The first charging chip 310 communicates with the charger 100 to determine whether the charger 100 supports a fast charging protocol.

For example, the charging protocol negotiation circuit 308 communicates with the charger 100 to determine whether the charger 100 supports the fast charging protocol, or the charging protocol negotiation circuit 308 determines whether the charger 100 and the charging circuit 300 support a same fast charging protocol. In addition, the charging protocol negotiation circuit 308 sends, to the controller 303, information about whether the charger 100 supports the fast charging protocol.

If the charger 100 does not support the fast charging protocol, step S103 is performed, or otherwise, step S104 is performed.

S103: The controller 303 continues to control the first switch 304 to close, and the first charging chip 310 continues to control the charger 100 not to increase a charging voltage.

Figure 8A:
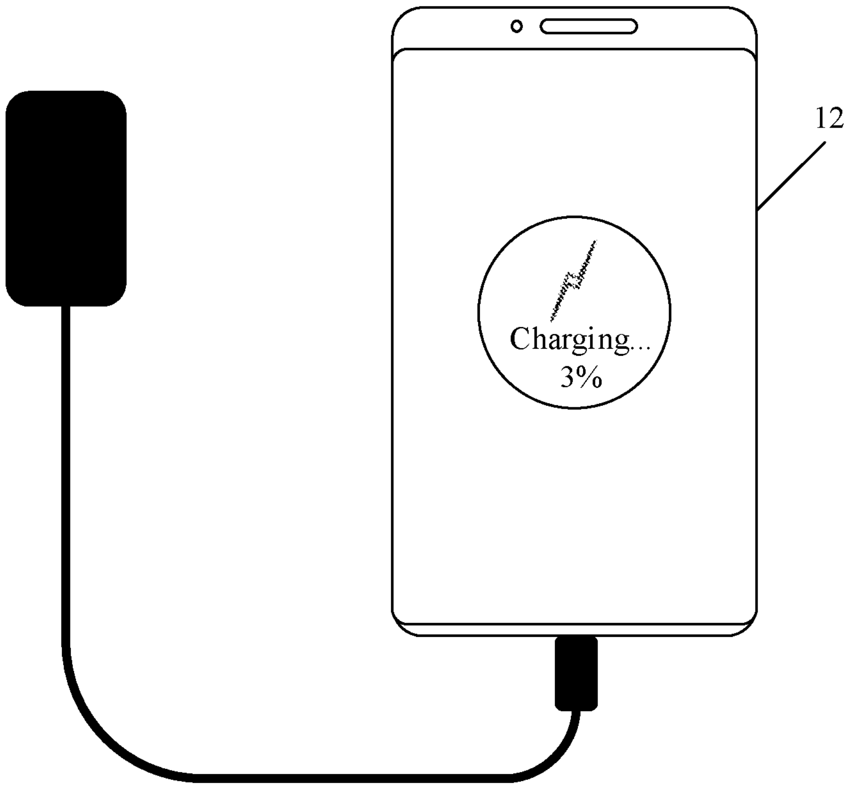
FIG. 8A and FIG. 8B are a schematic diagram of a display interface of an electronic device that is performing slow charging according to an embodiment of this application.
Figure 8B:
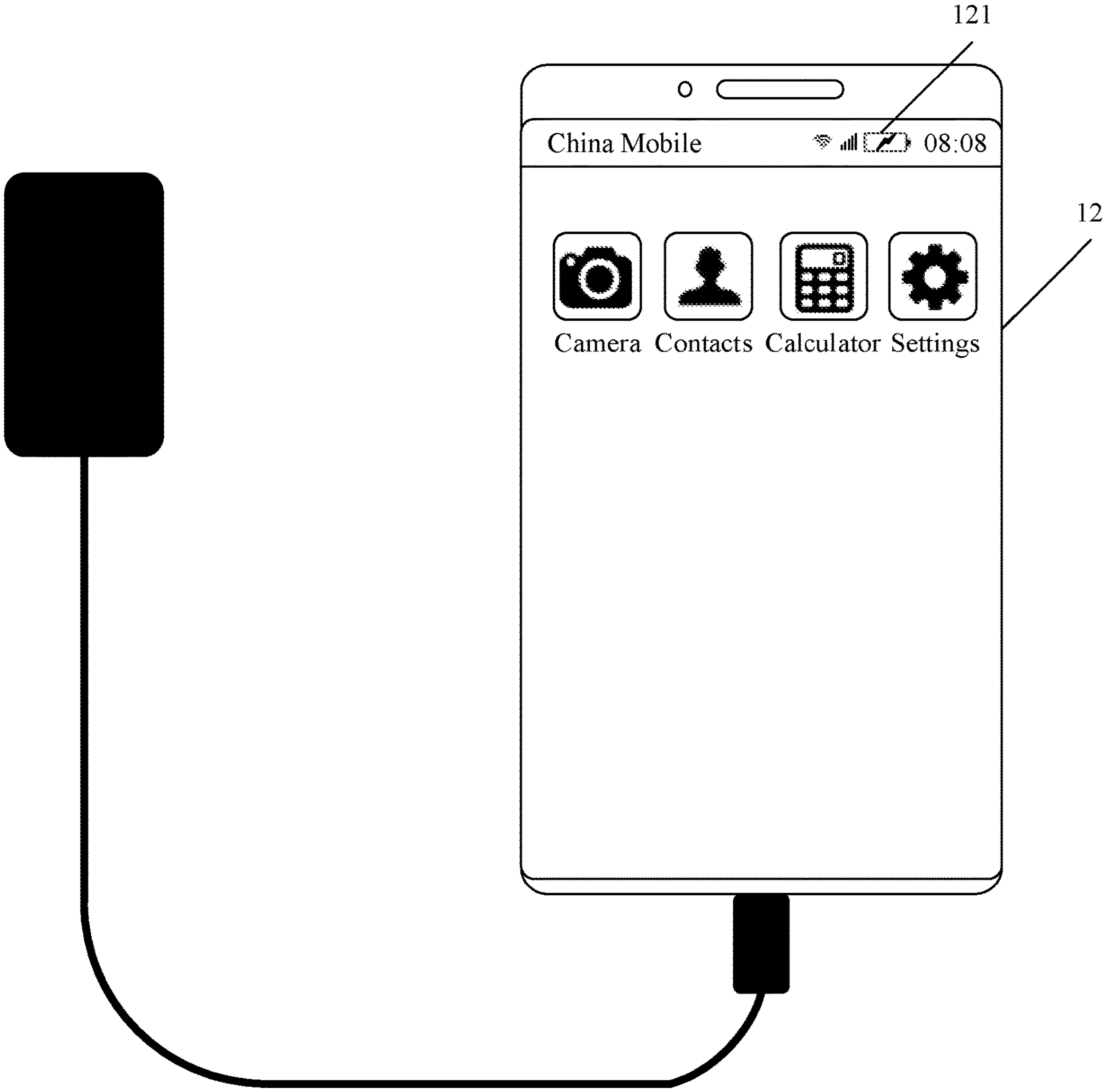

For example, a voltage output by the controller 303 to the control terminal 3041 of the first switch 304 is lower than a threshold, or the controller 303 configures the control terminal 3041 of the first switch 304 to be in a high resistance state, so that the first switch 304 is closed. The charging protocol negotiation circuit 308 of the first charging chip 310 communicates with the charger 100 to control the charger 100 not to increase the charging voltage. At this time, a slow charging phase is entered, until the battery 200 is fully charged. "Charging . . . " may be displayed on a display interface of an electronic device 12, as shown in FIG. 8A, or a slow charging icon 121 may be displayed on a display interface of the electronic device 12, as shown in FIG. 8B.

S104: The controller 303 controls the first switch 304 to open, controls the second switch 305 to close, and controls the first charging chip 310 to obtain power from the battery 200.

For example, a voltage output by the controller 303 to the control terminal 3041 of the first switch 304 is higher than a threshold, so that the first switch 304 is opened, that is, coupling between the charger 100 and the first charging chip 310 is disconnected. This prevents a charging voltage output by the charger 100 after a voltage increase from being applied to a pin of the first charging chip 310, thereby performing overvoltage protection on the first charging chip 310. The controller 303 controls the second switch 305 to close, so that the charger 100 charges the battery 200 by using the second charging sub-circuit 307.

During opening of the first switch 304, the controller 303 controls the first charging sub-circuit 306 to reversely supply power from the battery 200 to the charging protocol negotiation circuit 308. Specifically, as shown in FIG. 6, the controller 303 controls the selection switch K to couple the battery 200 to the second voltage conversion circuit 3062 (for example, an OTG circuit), so that the charging protocol negotiation circuit 308 is coupled to the battery 200 through the second voltage conversion circuit 3062 (for example, the OTG circuit) and the first voltage conversion circuit 3061, and the battery 200 supplies power to the charging protocol negotiation circuit 308 through the second voltage conversion circuit 3062 and the first voltage conversion circuit 3061. After the second voltage conversion circuit 3062 (for example, the OTG circuit) reversely increases the voltage of the battery 200, the first voltage conversion circuit 3061 performs voltage conversion and then provides an operating voltage (for example, 5 V) for the charging protocol negotiation circuit 308.

S105: The first charging chip 310 controls, based on the fast charging protocol, the charger 100 to increase the charging voltage, to fast charge the battery 200.

Figure 9A:
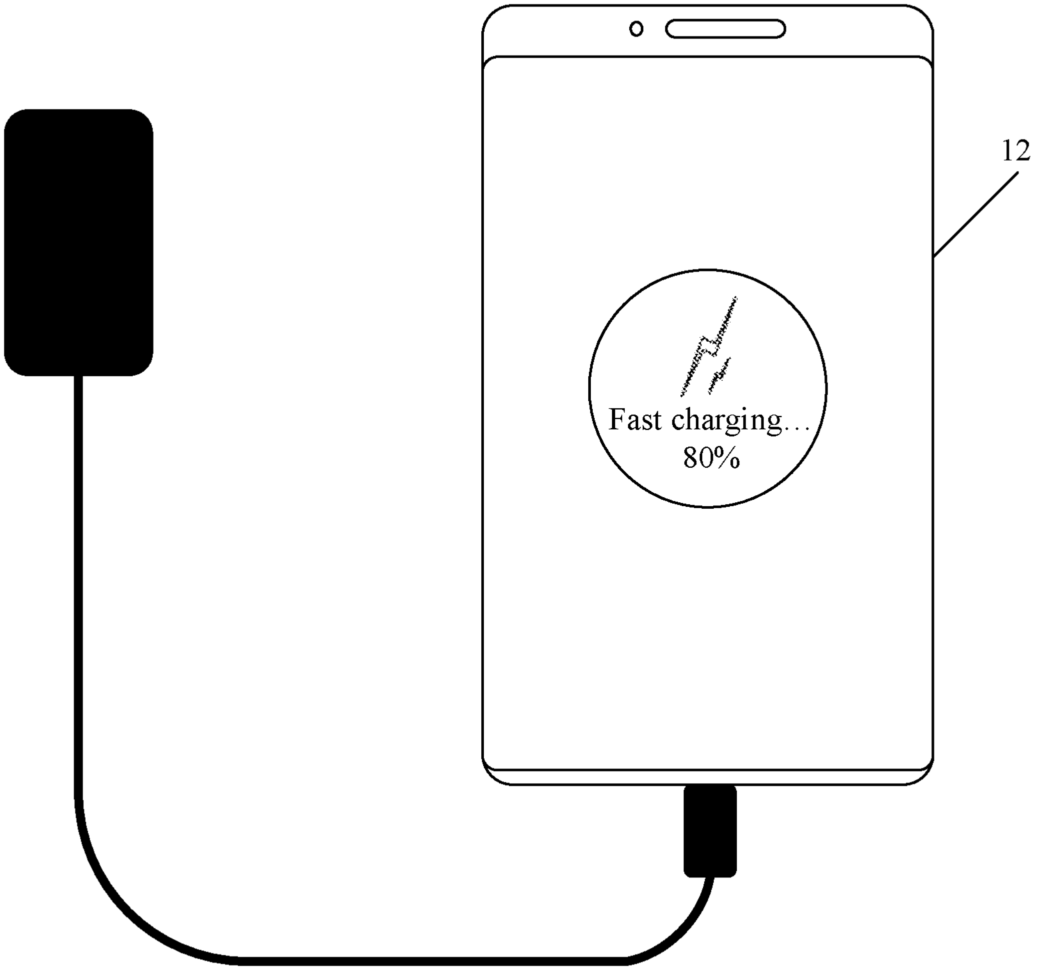
FIG. 9A and FIG. 9B are a schematic diagram of a display interface of an electronic device that is performing fast charging according to an embodiment of this application.
Figure 9B:
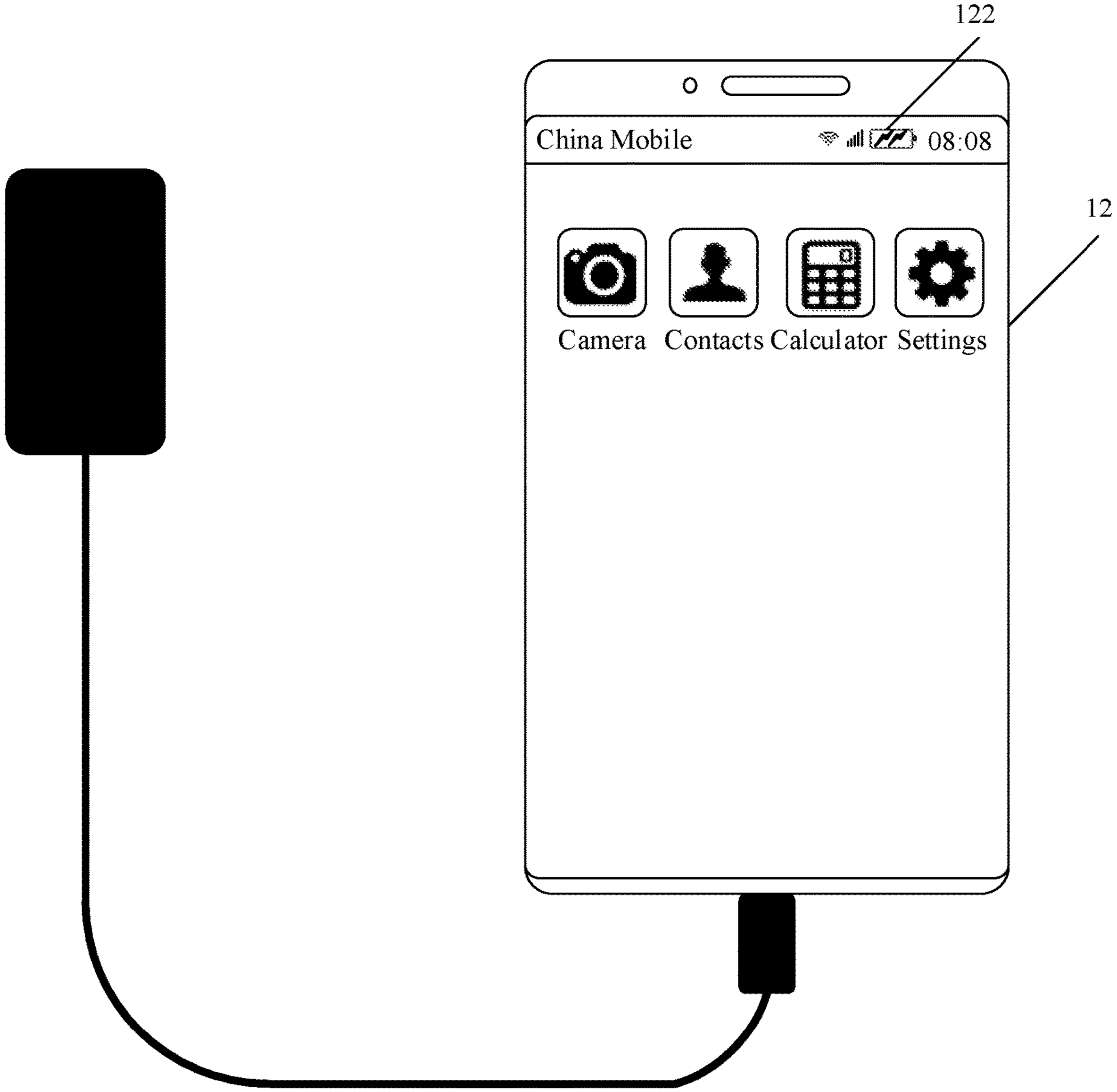

The charging protocol negotiation circuit 308 may control the charger 100 to increase the charging voltage to a target voltage. In this case, a fast charging phase (or referred to as a constant-current charging phase) is entered, until a power level of the battery 200 is greater than the threshold (for example, 90%). Before the fast charging phase ends, the charging protocol negotiation circuit 308 can always control the charging voltage of the charger 100 based on a control protocol. "Fast charging . . . " may be displayed on a display interface of an electronic device 12, as shown in FIG. 9A, or a fast charging icon 122 may be displayed on a display interface of the electronic device 12, as shown in FIG. 9B.

S106: The first charging chip 310 determines whether a fast charging phase ends.

Based on whether a voltage between a positive pole and a negative pole of the battery 200 is higher than the threshold, the first charging chip 310 can determine whether the fast charging phase ends. If the voltage between the positive pole and the negative pole of the battery 200 is lower than the threshold, the fast charging phase does not end and step S106 is still performed. If the voltage between the positive pole and the negative pole of the battery 200 is higher than or equal to the threshold, the fast charging phase ends and step S107 is performed.

S107: The first charging chip 310 controls the charger 100 to decrease a charging voltage.

For example, the charging protocol negotiation circuit 308 may communicate with the charger 100 to control the charger 100 to decrease the charging voltage, for example, to the default charging voltage (5 V).

S108: The controller 303 controls the first switch 304 to close, controls the second switch 305 to open, and controls the first charging chip 310 to obtain power from the charger 100 and charge the battery 200.

Figure 10A:
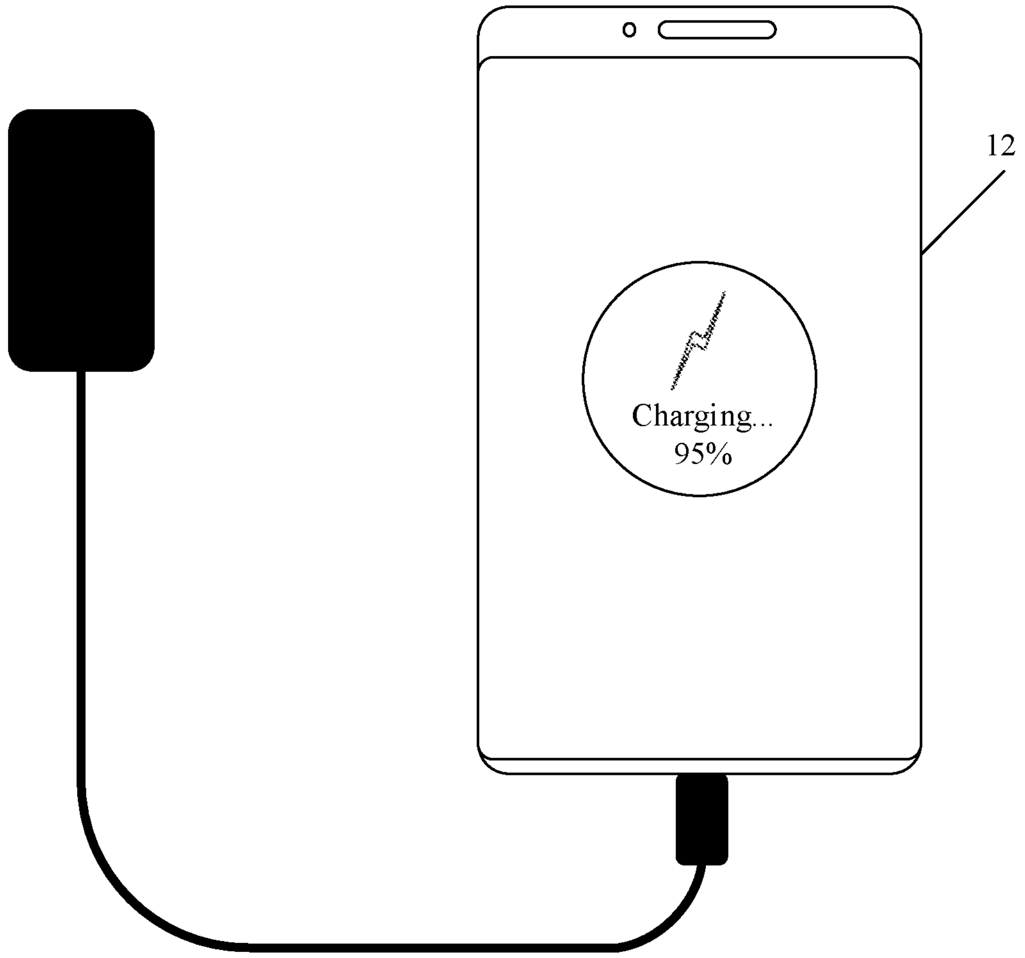
FIG. 10A and FIG. 10B are a schematic diagram of a display interface of another electronic device that is performing slow charging according to an embodiment of this application.
Figure 10B:
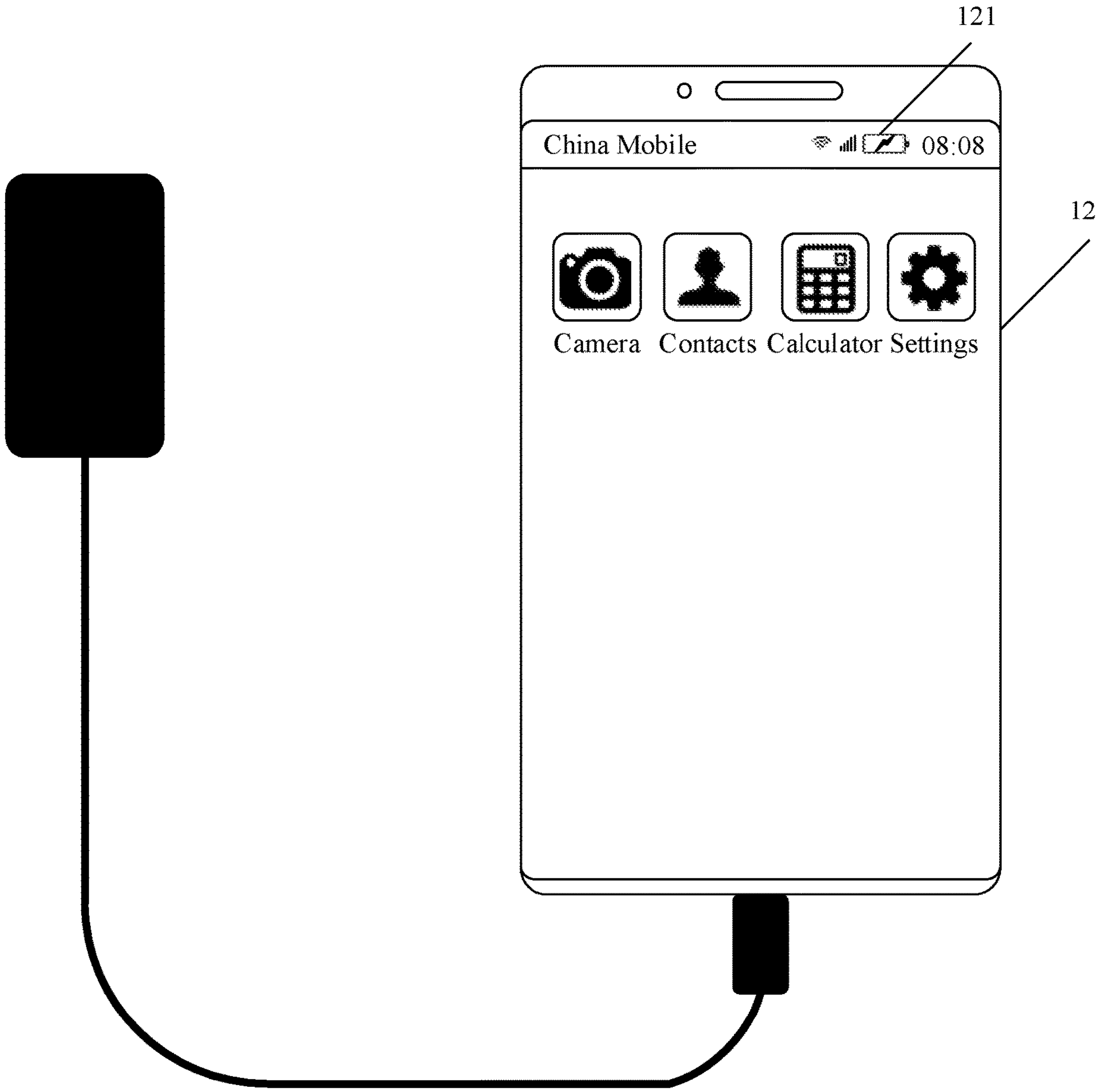

For example, a voltage output by the controller 303 to the control terminal 3041 of the first switch 304 is lower than the threshold, or the controller 303 configures the control terminal 3041 of the first switch 304 to be in a high resistance state, so that the first switch 304 is closed. As shown in FIG. 5, the controller 303 controls the selection switch K to couple the battery 200 to the first voltage conversion circuit 3061, so that the charger 100 supplies power to the charging protocol negotiation circuit 308 and the battery 200 by using the first charging sub-circuit 306 in the first charging chip 310, that is, performs slow charging (or referred to as a constant-voltage charging phase) on the battery 200, until the battery 200 is fully charged. "Charging . . . " may be displayed on a display interface of an electronic device 12, as shown in FIG. 10A, or a slow charging icon 121 may be displayed on a display interface of the electronic device 12, as shown in FIG. 10B.

According to the charging circuit, the charging control method, and the electronic device provided in the embodiments of this application, when the electronic device is coupled to the charger to charge the battery in the electronic device, the charging circuit in the electronic device negotiates with the charger to determine that the charger supports the fast charging protocol, coupling between the power supply terminal of the charger and the first charging sub-circuit that is in the charging circuit and that supports the slow charging protocol is disconnected, the power supply terminal of the charger is coupled to the second charging chip that supports the fast charging protocol, the first charging chip is controlled to obtain power from the battery, and the first charging chip controls the charger to increase the charging voltage, so that the charger fast charges the battery by using the second charging sub-circuit, and the first charging chip that is non-resistant to a high voltage is prevented from bearing a high charging voltage, thereby implementing overvoltage protection on the charging circuit in the electronic device.

Figure 11:
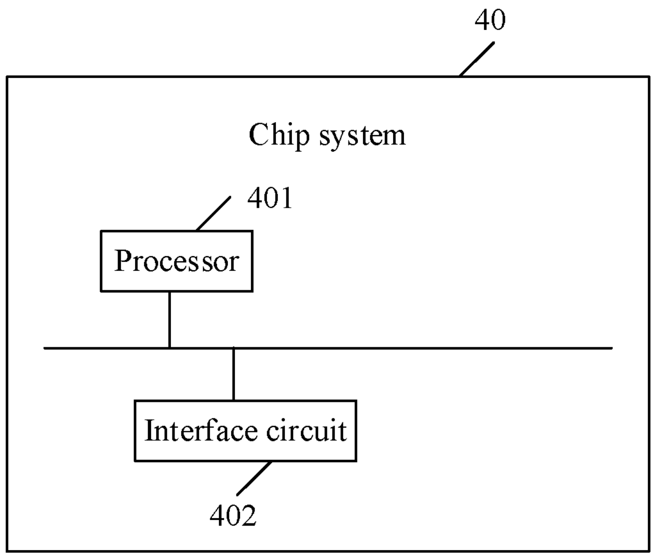
FIG. 11 is a schematic diagram of a structure of a chip system according to an embodiment of this application.

As shown in FIG. 11, an embodiment of this application further provides a chip system. The chip system 40 includes at least one processor 401 and at least one interface circuit 402. The at least one processor 401 and the at least one interface circuit 402 may be interconnected through a line. The processor 401 is configured to support an electronic device in implementing various functions or steps in the method embodiment described above. The at least one interface circuit 402 may be configured to receive a signal from another apparatus (for example, a memory), or send a signal to another apparatus (for example, a communication interface). The chip system may include a chip, and may further include another discrete device.

An embodiment of this application further provides a computer-readable storage medium. The computer-readable storage medium includes instructions. When the instructions are run on the foregoing electronic device, the electronic device is enabled to perform various functions or steps in the foregoing method embodiment, for example, perform the method shown in FIG. 7.

An embodiment of this application further provides a computer program product including instructions. When the instructions are run on the foregoing electronic device, the electronic device is enabled to perform various functions or steps in the foregoing method embodiment, for example, perform the method shown in FIG. 7.

For technical effects of the chip system, the computer-readable storage medium, and the computer program product, refer to the technical effects of the foregoing method embodiment.

It should be understood that sequence numbers of the foregoing processes do not mean execution sequences in various embodiments of this application. The execution sequences of the processes should be determined according to functions and internal logic of the processes, and should not constitute any limitation on the implementation processes of the embodiments of this application.

A person of ordinary skill in the art may be aware that, in combination with the examples described in the embodiments disclosed in this specification, modules and algorithm steps may be implemented by electronic hardware or a combination of computer software and electronic hardware. Whether a function is executed in a hardware or software manner depends on a specific application and a design constraint of a technical solution. A person skilled in the art may implement the described functions by using different methods for each specific application, but it should not be considered that the implementation goes beyond the scope of this application.

A person skilled in the art may clearly understand that, for convenient and brief description, for a detailed working process of the system, apparatus, and module described above, refer to a corresponding process in the method embodiment. Details are not described herein again.

In the several embodiments provided in this application, it should be understood that the disclosed system, device, and method may be implemented in other manners. For example, the described device embodiment is merely an example. For example, division of the modules is merely logical function division and there may be other division manners during actual implementation. For example, a plurality of modules or components may be combined or integrated into another device, or some features may be ignored or not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate parts may or may not be physically separate, and parts displayed as modules may or may not be physical modules, may be located in one device, or may be distributed on a plurality of devices. Some or all of the modules may be selected according to actual requirements to implement the objectives of the solutions of the embodiments.

In addition, functional modules in the embodiments of this application may be integrated into one device, or each of the modules may exist alone physically, or two or more modules may be integrated into one device.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as coaxial cable, optical fiber, or digital subscriber line (Digital Subscriber Line, DSL)) or wireless (such as infrared, radio, or microwave) manner. The computer-readable storage medium may be any available medium accessible to a computer, or a data storage device, for example, a server or a data center, integrating one or more available media. The available medium may be a magnetic medium (for example, a floppy disk, a hard disk, or a magnetic tape), an optical medium (for example, a DVD), a semiconductor medium (for example, a solid state disk (Solid State Disk, SSD)), or the like.

The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A charging circuit, comprising a first power supply terminal, a second power supply terminal, a controller, a first switch, a second switch, a first charging chip, and a second charging chip, wherein the first switch is coupled to the first charging chip and the second switch is coupled to the second charging chip, and the second charging chip supports a fast charging protocol;

wherein the first charging chip comprises a charging protocol negotiation circuit, an on-the-go (OTG) circuit, and a selection switch; the first power supply terminal is coupled to the first charging chip through the first switch and coupled to the second charging chip through the second switch, and the first power supply terminal is configured to be coupled to a power supply terminal of a charger; the first charging chip and the second charging chip are further coupled to the second power supply terminal, and the second power supply terminal is configured to be coupled to a battery; and the charging protocol negotiation circuit is configured to be coupled to a communication terminal of the charger;

the charging protocol negotiation circuit is configured to communicate with the charger to determine that the charger supports the fast charging protocol;

the controller is configured to control the first switch to open, control the second switch to close, and control the selection switch to couple the charging protocol negotiation circuit to the battery through the OTG circuit of the first charging chip, so that the battery supplies power to the charging protocol negotiation circuit through the OTG circuit of the first charging chip; and the charging protocol negotiation circuit is further configured to control, based on the fast charging protocol, the charger to increase a charging voltage, to fast charge the battery by using the second charging chip.

2. The charging circuit according to claim 1, wherein after fast charging ends, the first charging chip is further configured to control the charger to decrease a charging voltage; and the controller is further configured to control the first switch to close, control the second switch to open, and control the first charging chip to obtain power from the charger and charge the battery.

3. The charging circuit according to claim 1, wherein the charging circuit further comprises a voltage divider circuit, and the first switch comprises a control terminal, a first controlled terminal, and a second controlled terminal; and the first controlled terminal is coupled to the first power supply terminal, the second controlled terminal is coupled to the first charging chip, the voltage divider circuit is configured to divide a voltage of the first power supply terminal for output to the control terminal, and when a voltage of the control terminal is higher than a threshold, the first controlled terminal is disconnected from the second controlled terminal.

4. The charging circuit according to claim 3, wherein the voltage divider circuit comprises a first resistor and a second resistor that are connected in series, the first power supply terminal is grounded through the first resistor and the second resistor that are connected in series, and coupling terminals of the first resistor and the second resistor are coupled to the control terminal of the first switch.

5. The charging circuit according to claim 3, wherein the charging circuit further comprises a diode, the controller is coupled to an anode of the diode, a cathode of the diode is coupled to the control terminal of the first switch, and the controller controls disconnection or connection between the first controlled terminal and the second controlled terminal by controlling the voltage of the control terminal of the first switch.

6. An electronic device, comprising the charging circuit according to claim 1 and a battery, wherein the charging circuit is configured to charge the battery.

7. A charging control method, applied to an electric device comprising a battery and a charging circuit configured to charge the battery, wherein the charging circuit comprises a controller, a first switch, a second switch, a first charging chip, and a second charging chip, the first charging chip comprises a charging protocol negotiation circuit, an on-the-go (OTG) circuit, and a selection switch, the second charging chip supports a fast charging protocol, and the method comprises:

communicating, by the charging protocol negotiation circuit, with a charger to determine that the charger supports the fast charging protocol;

controlling, by the controller, the first switch to disconnect the first charging chip from the charger, controlling the second switch to connect the second charging chip to the charger, and controlling the selection switch to couple the charging protocol negotiation circuit to the battery through the OTG circuit of the first charging chip, supply power from the battery to the charging protocol negotiation circuit through the OTG circuit of the first charging chip; and controlling, by the charging protocol negotiation circuit based on the fast charging protocol, the charger to increase a charging voltage, to fast charge the battery by using the second charging chip.

8. The method according to claim 7, further comprising:

after fast charging ends, controlling, by the first charging chip, the charger to decrease a charging voltage; and controlling, by the controller, the first switch to connect the first charging chip to the charger, controlling the second switch to disconnect the second charging chip from the charger, and controlling the first charging chip to obtain power from the charger and charge the battery.

9. A charging circuit, comprising a first power supply terminal, a second power supply terminal, a controller, a first switch, a second switch, a first charging chip, and a second charging chip, wherein the first switch is coupled to the first charging chip and the second switch is coupled to the second charging chip, wherein the first charging chip comprises a charging protocol negotiation circuit, an on-the-go (OTG) circuit, and a selection switch; the second charging chip supports a fast charging protocol; the first power supply terminal is coupled to the first charging chip through the first switch and coupled to the second charging chip through the second switch, and the first power supply terminal is configured to be coupled to a power supply terminal of a charger; the first charging chip and the second charging chip are further coupled to the second power supply terminal, and the second power supply terminal is configured to be coupled to a battery; and the charging protocol negotiation circuit is configured to be coupled to a communication terminal of the charger;

the charging protocol negotiation circuit is configured to communicate with the charger to determine that the charger supports the fast charging protocol;

the controller is configured to control the first switch to open, control the second switch to close, and control the selection switch to couple the charging protocol negotiation circuit to the battery through the OTG circuit of the first charging chip, so that the battery supplies power to the charging protocol negotiation circuit through the OTG circuit of the first charging chip;

the charging protocol negotiation circuit is further configured to control, based on the fast charging protocol, the charger to increase a charging voltage, to fast charge the battery by using the second charging chip, wherein the charging circuit further comprises a voltage divider circuit coupled between the first power supply terminal and the first switch, and the voltage divider circuit is configured to divide a voltage at the first power supply terminal for output to the first switch.

10. The charging circuit according to claim 9, wherein after fast charging ends, the first charging chip is further configured to control the charger to decrease a charging voltage; and the controller is further configured to control the first switch to close, control the second switch to open, and control the first charging chip to obtain power from the charger and charge the battery.

11. The charging circuit according to claim 9, wherein the charging circuit further comprises a voltage divider circuit, and the first switch comprises a control terminal, a first controlled terminal, and a second controlled terminal; the first switch comprises a control terminal, a first controlled terminal, and a second controlled terminal; and the first controlled terminal is coupled to the first power supply terminal, the second controlled terminal is coupled to the first charging chip, the voltage divider circuit is configured to divide the voltage of the first power supply terminal for output to the control terminal, and when a voltage of the control terminal is higher than a threshold, the first controlled terminal is disconnected from the second controlled terminal.

12. The charging circuit according to claim 9, wherein the voltage divider circuit comprises a first resistor and a second resistor that are connected in series, the first power supply terminal is grounded through the first resistor and the second resistor that are connected in series, and coupling terminals of the first resistor and the second resistor are coupled to the control terminal of the first switch.

13. The charging circuit according to claim 9, wherein the charging circuit further comprises a diode, the controller is coupled to an anode of the diode, a cathode of the diode is coupled to the control terminal of the first switch, and the controller controls disconnection or connection between the first controlled terminal and the second controlled terminal by controlling the voltage of the control terminal of the first switch.

14. The electronic device according to claim 6, wherein the charging circuit further comprises a voltage divider circuit, and the first switch comprises a control terminal, a first controlled terminal, and a second controlled terminal; and the first controlled terminal is coupled to the first power supply terminal, the second controlled terminal is coupled to the first charging chip, the voltage divider circuit is configured to divide a voltage of the first power supply terminal for output to the control terminal, and when a voltage of the control terminal is higher than a threshold, the first controlled terminal is disconnected from the second controlled terminal.

15. The electronic device according to claim 14, wherein the voltage divider circuit comprises a first resistor and a second resistor that are connected in series, the first power supply terminal is grounded through the first resistor and the second resistor that are connected in series, and coupling terminals of the first resistor and the second resistor are coupled to the control terminal of the first switch.

16. The electronic device according to claim 15, wherein the charging circuit further comprises a diode, the controller is coupled to an anode of the diode, a cathode of the diode is coupled to the control terminal of the first switch, and the controller controls disconnection or connection between the first controlled terminal and the second controlled terminal by controlling the voltage of the control terminal of the first switch.

17. The electronic device according to claim 15, wherein the charging protocol negotiation circuit and the on-the-go OTG circuit are integrated in the first charging chip and the first charging chip does not support the fast charging protocol.

18. The method according to claim 8, wherein the charging circuit further comprises a voltage divider circuit, and the method further comprises dividing a voltage of the first power supply terminal for output to the first switch.

19. The charging circuit according to claim 1, wherein the first charging chip further comprises a first voltage conversion circuit, a second voltage conversion circuit, and the selection switch, both of the first voltage conversion circuit and the second voltage conversion circuit are coupled to a controlled terminal of the first switch, and the first voltage conversion circuit is further coupled to the charging protocol negotiation circuit;

the selection switch is configured to select, by a control of the controller, the first voltage conversion circuit when the first switch is closed and the second switch is opened or the second voltage conversion circuit to be coupled to the battery when the first switch is opened and the second switch is closed, when the selection switch is coupled to the first voltage conversion circuit, the first voltage conversion circuit is coupled to the battery, and the first voltage conversion circuit is configured to provide a charging voltage for the charging protocol negotiation circuit and a charging voltage for the battery, and when the selection switch is coupled to the second voltage conversion circuit, the second voltage conversion circuit is coupled to the battery, and the second voltage conversion circuit is configured to provide a charging voltage from the battery to the charging protocol negotiation circuit through the first voltage conversion circuit.

20. The charging circuit according to claim 19, wherein the first voltage conversion circuit is a low dropout regulator, and the second voltage conversion circuit is the on-the-go OTG circuit.

* * * * *